US008697587B2

(12) United States Patent
Arora et al.

(10) Patent No.: US 8,697,587 B2
(45) Date of Patent: Apr. 15, 2014

(54) NANOWEBS

(75) Inventors: Pankaj Arora, Chesterfield, VA (US); Guanghui Chen, Glen Allen, VA (US); Simon Frisk, Newark, DE (US); David Keith Graham, Jr., Richmond, VA (US); Robert Anthony Marin, Midlothian, VA (US); Hageun Suh, Chadds Ford, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/496,242

(22) Filed: Jul. 1, 2009

(65) Prior Publication Data

US 2009/0261035 A1  Oct. 22, 2009

Related U.S. Application Data

(63) Continuation of application No. 11/523,827, filed on Sep. 20, 2006, now abandoned.

(51) Int. Cl.
*D04H 3/00* (2012.01)
*B32B 27/02* (2006.01)

(52) U.S. Cl.
USPC ........... 442/334; 442/340; 442/373; 442/381; 428/332; 428/340; 428/364; 428/401; 977/755; 977/762

(58) Field of Classification Search
USPC .......... 442/334, 340, 373, 381; 977/755, 762; 428/332, 340, 364, 401
See application file for complete search history.

(56) References Cited

U.S. PATENT DOCUMENTS

| 2,277,049 | A |   | 3/1942  | Reed |
|-----------|---|---|---------|------|
| 3,291,677 | A |   | 12/1966 | Coates et al. |
| 4,035,219 | A |   | 7/1977  | Cumbers |
| 4,127,706 | A |   | 11/1978 | Martin et al. |
| 4,606,264 | A |   | 8/1986  | Agronin et al. |
| 5,424,115 | A |   | 6/1995  | Stokes |
| 5,435,957 | A |   | 7/1995  | Degen et al. |
| 5,709,735 | A | * | 1/1998  | Midkiff et al. .................... 96/17 |
| 5,858,515 | A |   | 1/1999  | Stokes et al. |
| 6,554,881 | B1 | * | 4/2003 | Healey ............................ 55/528 |
| 7,037,407 | B2 |   | 5/2006 | Koivukunnas et al. |
| 7,112,389 | B1 | * | 9/2006 | Arora et al. ................... 429/128 |
| 7,170,739 | B1 | * | 1/2007 | Arora et al. ................... 361/502 |
| 7,183,020 | B2 |   | 2/2007 | Sudou et al. |

(Continued)

FOREIGN PATENT DOCUMENTS

EP        1 775 006 A1    4/2007
WO       WO 99/32699      7/1999

(Continued)

OTHER PUBLICATIONS

Youjiang Wang, "Effect of Consolidation Method on the Mechanical Properties of Nonwoven Fabric Reinforced Composites", Applied Composite Materials 6, 1999, pp. 19-34.

(Continued)

*Primary Examiner* — Matthew Matzek

(57) ABSTRACT

A nonwoven web of fibers that have a number average diameter of less than 1 micron. The web can have a Poisson Ratio of less than about 0.8, a solidity of at least about 20%, a basis weight of at least about 1 gsm, and a thickness of at least 1 micrometer.

24 Claims, 2 Drawing Sheets

(56) References Cited

U.S. PATENT DOCUMENTS

| | | |
|---|---|---|
| 2004/0038013 A1 | 2/2004 | Schaefer et al. |
| 2004/0038014 A1 | 2/2004 | Schaefer et al. |
| 2005/0020173 A1 | 1/2005 | Bonneh et al. |
| 2005/0163955 A1 | 7/2005 | Schaefer et al. |
| 2007/0184256 A1* | 8/2007 | Okada et al. ............... 428/304.4 |

FOREIGN PATENT DOCUMENTS

| | | |
|---|---|---|
| WO | WO 02/20130 | 3/2002 |
| WO | WO 03/080905 A1 | 10/2003 |
| WO | WO 2005/040495 | 5/2005 |
| WO | WO 2005098118 A1 * | 10/2005 |
| WO | WO 2006/071979 | 7/2006 |
| WO | WO 2007/041311 | 4/2007 |

OTHER PUBLICATIONS

Kim et al., "Characterization of Structural Changes in Nonwoven Fabrics During Load-Deformation Experiments", Journal of Textile and Apparel, vol. 1, Issue 1, Sep. 2000, pp. 1-6.

Petterson, "Mechanics of Nonwoven Fabrics", Industrial and Engineering Chemistry, Chicopee Manufacturing Corp., pp. 902-903.

H.J. Qi, K. Joyce, M.C. Boyce, Durometer Harness and the Stress-Strain behavior of Elastomeric Materials, Rubber chemistry and technology, vol. 76/ 2, pp. 419-435, Jul. 2002.

Mechanical Properties of Steel- Condition, Strength, Hardness, Machinability http://www.pivotpins.com/pdf/mechanical_properties_of_steel.pdf, Apr. 2005.

* cited by examiner

NANOWEBS

The present invention is directed towards an improved nonwoven web comprising nanofibers and a process for consolidating and stabilizing such a web.

BACKGROUND

"Nanowebs" are nonwoven webs comprising primarily, or even exclusively, fibers that have a number average diameter of less than one micrometer. Due to their extremely small pore dimensions and high surface area to volume ratio, nanowebs have been expected to be utilized as substrates for many applications such as, for example, high performance air filtration, waste water filtration, filtration membranes for biological contaminants, separators for batteries and other energy storage devices. However, one disadvantage of nanowebs for these applications is their poor mechanical integrity.

The number average diameter of nanofibers are less than 1000 nm and sometimes as small as 20 nm. In this dimension, even if they are layered and formed as thick membranes, the mechanical strength of the resulting structures is not sufficient to withstand macroscopic impacts for filtration applications such as normal liquid or air flows passing through them or higher strength required for winding and handling during end use manufacturing steps. Nanowebs made for example by electrospinning or electroblowing also tend to have low solids volume content (solidity), typically less than about 20%.

Unsupported nanowebs also exhibit an excessive reduction in width ("necking") when tension is applied in the machine direction (MD), such as when winding or post processing, for example, when applying surface treatments and laminating for some product applications. Where the material is unwound and wound again, varying tensions can result in different widths and potentially create variations in sheet properties. A material is desired which is more robust with regard to applied tension.

The low surface stability of electrospun and electroblown nanowebs also creates problems when handling the sheet or when the sheet goes over rolls or other surfaces. Fibers are removed from the sheet and collect on various contact surfaces, such as hands, rolls, guides, etc., and sheet properties can be potentially changed and/or process equipment contaminated with fibers. A material with a more stable surface is desired.

The open structure of "as-spun" nanowebs typically yields structures with a solidity in the range of 20% to 10% or even lower. This open structure provides low resistance to fluid flow and/or ion flow due to the low solidity, which conversely can be reported as large total pore volume percent or "porosity". Typically, as-spun nanowebs have maximum pore sizes between fibers of in the range of about 0.5 to 10 micrometers, even as high as 20 micrometers, and mean flow pore size ranges between about 0.05 to 10 micrometers.

Some fabric applications require smaller pore size and hence higher web solidity, approaching or even within the 40% to 90% range. These fabrics exhibit higher filtration efficiency and in general better overall barrier properties for fluids, and resistance to "short-circuit" in battery separator and other energy storage applications. Other applications require low air flow and low liquid flow while yielding a low resistance to moisture vapor transmission and require the higher % solidity materials or small pores. Conventional nanowebs are currently excluded from these applications that require higher solidity, since there is typically not enough nanoweb material to modify to smaller pore size and higher solidity. Instead, nonwoven webs which can be produced in commercially acceptable sizes and basis weights, such as meltblown webs, are often used in such applications. However, meltblown webs consist of much larger fibers, typically between about 2 to 10 micrometers in diameter, and modification of as-spun meltblown webs to meet the small pore size limitations necessary for high filtration efficiency requires high solidities, even as high as about 80%, and results in dramatic decreases in fluid flow rates through such modified meltblown webs.

"As-spun" nanowebs also exhibit relatively high surface drag or friction, a surface coefficient of friction as high as about 2.5. Some material applications require smoother or softer, low friction hand. Other applications require a smooth outer surface for filter cake release, or low liquid flow resistance. For a material to be used in these applications, it requires a "smooth" surface which promotes low friction and high wear resistance.

It is known that physical properties of a web can be improved by calendering, which is the process of passing a sheet material through a nip between rolls or plates to impart a smooth, glossy appearance to the sheet material or otherwise improving selected physical properties.

Through the calendering of paper or other fibrous materials, an effort is made to further improve the quality of paper formed or, in providing a standard level of quality, to achieve a higher running speed or increased bulk of the paper being produced. It is well known that the plasticity or molding tendency of paper or fiber may be increased by raising the temperature and/or the plasticizer content of the paper or fiber. A considerable change in mechanical properties, including plasticity, occurs when the temperature of the polymers contained in the paper rises to or beyond the so-called glass transition temperature ($T_g$), at which point the material may then be more readily molded or formed or finished than it can below that temperature.

The prior art discloses various methods and apparatus for confining the deformation of web fibers to only the surface portions of the web. U.S. Pat. No. 4,606,264 provides a method and apparatus for temperature gradient calendering, wherein paper or like material is passed into at least one nip formed by an iron roll and a soft roll. The iron roll is heated to at least the temperature at which the fibers in the web begin to deform; for paper, that temperature is approximately 350° F. As therein disclosed, it is preferred that the web is passed through two successive nips, one for glazing one face of the web and the other for glazing the opposite face.

Many nonwoven fabrics are interfilamentarily bonded to impart integrity to the fabric. While there are several bonding techniques available, thermal bonding processes prevail in the nonwovens industry both in volume and time devoted to the research and development of new products. These processes have gained wide acceptance due to simplicity and many advantages over traditional chemical bonding methods. Attractive features include low energy and raw material costs, increased production rates, and product versatility. Chemical simplification, since adhesive binders are not used, reduces concerns over the environment. U.S. Pat. No. 4,035,219 and U.S. Pat. No. 5,424,115 provide examples of point bonding of nonwoven webs to enhance physical properties.

U.S. Pat. No. 2,277,049 to Reed introduced the idea of using fusible fibers to make nonwoven fabrics by blending fusible and nonfusible fibers of similar denier and cut length and treating the web with either solvent or heat. The fusible fibers become tacky and act as a binder. A nonwoven fabric results after pressing and cooling the tacky web.

However, the use of temperatures near the melting point (Tm) of the fiber in a nanoweb is detrimental to the quality of the web. The small size of the fibers combined with the uneven heating inherent in calendering machinery tend to produce uneven melting and bonding and render the web less effective for filtration and battery separator and other energy storage applications. The deficiency in the prior art in the area of strengthening of webs of low basis weight and comprising fine denier fiber is exemplified in EP 1 042 549, in which thermal bonding in a pattern is used to produce a less deformable web. The factor Poisson's Ratio times basis weight (in ounces per square yard) is disclosed to be limited to less than 1.2, but Poisson's Ratios of the order of 2.5 to 4 are exemplified. Similarly in U.S. Pat. No. 5,858,515, a bonding pattern is described that strengthens a web but at the cost of a considerable reduction in open area or porosity.

However, these prior art methods are neither concerned with nor directed to the stabilization of nanoweb structures, and the delicate nature of nanowebs has heretofore prevented application of these techniques to their stabilization. Application of temperatures that melt or deform such fine webs results essentially in the destruction of the web fiber network.

There is therefore a need for a process to strengthen nanowebs while retaining their porosity and uniformity.

The present invention is directed to increasing the utility of nanowebs by improving their physical properties while maintaining a high open area and hence porosity, and to the webs produced thereby.

SUMMARY OF THE INVENTION

In one embodiment the product of the invention is a nonwoven nanoweb comprising a web of polymer nanofibers having a Poisson Ratio of less than about 0.8, a solidity of at least about 20%, a basis weight of at least about 1 gram per square meter (gsm), and a thickness of at least about 1 µm.

The invention is also directed to a nonwoven web formed by calendering a polymeric nanoweb through a nip between a first roll and a second roll and applying a pressure to the web across the thickness of the web, wherein one of the first roll and the second roll is a hard roll, the other roll being a soft roll having a hardness less than Rockwell B 70, and heating the web to a temperature between the $T_g$ and $T_{om}$ of the nanoweb polymer, where $T_{om}$ is defined as the temperature of the onset of melting, wherein the nanoweb has less than about 15% by area in the plane of the web comprising melted regions.

The invention is also directed to a process for stabilizing the surface of an electroblown or electrospun polymeric nanoweb comprising calendering the web through a nip between a first roll and a second roll and applying pressure to the web across the thickness of the web, wherein one of the first roll and the second roll is a hard roll, the other roll being a soft roll, and heating the web to between its $T_g$ and its $T_{om}$.

In another embodiment, the invention is directed to a nonwoven nanoweb comprising polymer nanofibers having a solidity of at least about 20%, a basis weight of at least about 1 gsm, a thickness of between about 1 µm and 400 µm and a maximum pore size of about 5 micrometers, wherein the nanoweb has less than about 15% by area in the plane of the web comprising melted regions.

In a further embodiment, the invention is directed to a nonwoven nanoweb comprising polymer nanofibers having a solidity of at least about 20%, a basis weight of at least about 1 gsm, a thickness of at least about 1 µm and a tensile strength at break in the machine direction of at least about 4.1 MPa, wherein the nanoweb has less than about 15% by area in the plane of the web comprising melted regions.

DETAILED DESCRIPTION OF THE INVENTION

Figure 1:
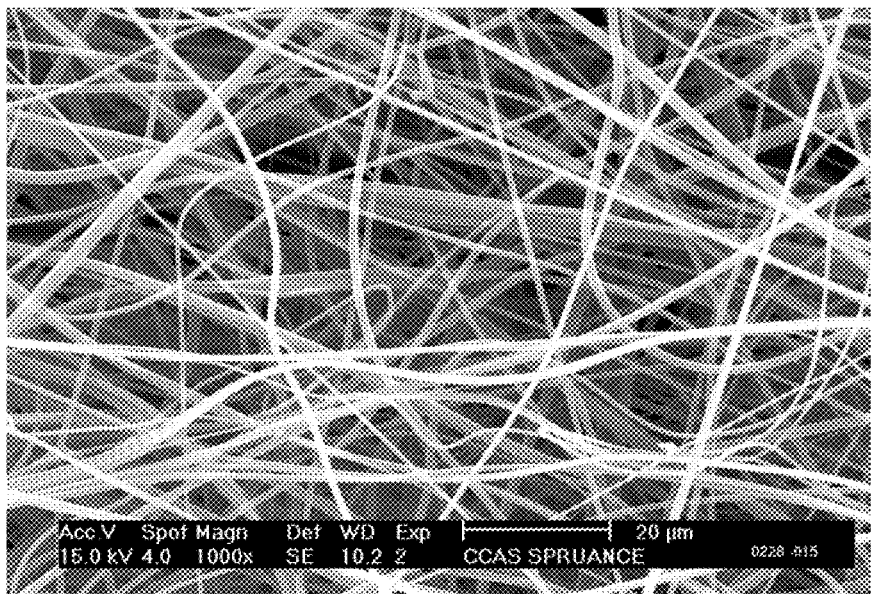
FIG. 1 is a photomicrograph of an as-spun nanoweb derived from the electroblowing process, described herein as Comparative Example 1.

The present invention is directed to a process for improving the mechanical integrity, which includes surface stability, strength, and Poisson's ratio of polymeric nanowebs, while preserving their porosity, so the nanowebs are suitable for various high performance applications, such as for liquid filtration and separators in batteries or other energy storage devices, such as capacitors and the like. The process stabilizes both the surface of the nanowebs and their cross direction width dimension, without significantly affecting the porosity of the nanowebs, by avoiding melting the nanofibers of the webs at bonding points, and without adhesive bonding. A calendaring/stretching process can be used to control the pore size and/or the solidity of polymeric nanowebs.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

"Calendering" is the process of passing a web through a nip between two rolls. The rolls may be in contact with each other, or there may be a fixed or variable gap between the roll surfaces. Advantageously, in the present calendering process, the nip is formed between a soft roll and a hard roll. The "soft roll" is a roll that deforms under the pressure applied to keep two rolls in a calender together. The "hard roll" is a roll with a surface in which no deformation that has a significant effect on the process or product occurs under the pressure of the process. An "unpatterned" roll is one which has a smooth surface within the capability of the process used to manufacture them. There are no points or patterns to deliberately produce a pattern on the web as it passed through the nip, unlike a point bonding roll.

A "scrim" is a support layer and can be any planar structure with which the nanoweb can be bonded, adhered or laminated. Advantageously, the scrim layers useful in the present invention are spunbond nonwoven layers, but can be made from carded webs of nonwoven fibers and the like. Scrim layers useful for some filter applications require sufficient stiffness to hold pleats and dead folds.

As used herein, the term "machine direction" or "MD" means the direction in which the length of a fabric is produced on the machine that produces it. The term "cross direction" or "CD" means the width of a fabric, i.e., a direction generally perpendicular to the MD and the thickness direction of the web.

As used herein, the term "Poisson Ratio" is a measurement of the dimensional stability of the fabric in the cross direction. The lower the Poisson Ratio, the better the dimensional stability of the fabric. In particular, the Poisson Ratio is a measurement of the relative change in width with a change in length. The better the dimensional stability of the fabric, the lesser the tendency of the fabric to "neck in" during the converting process. The Poisson Ratio (PR) is a dimensionless number calculated by the following formula:

$$PR=\{(W_0-W_i)/W_0\}/\{(L_i-L_0)/L_0\};$$

wherein $W_0$ is the initial sample width, $W_i$ is the sample width at an extended length $L_1$, $L_0$ is the initial sample length, and the value of $L_0$ is a minimum of four (4) times the value of $W_0$, and $L_i$ is the sample length at a given extension.

The "footprint" is the area of the web that is compressed as it passes between the two calendar rolls. The footprint can be measured by the length that the web is compressed in the MD at any point along the CD of the web.

Figure 2:
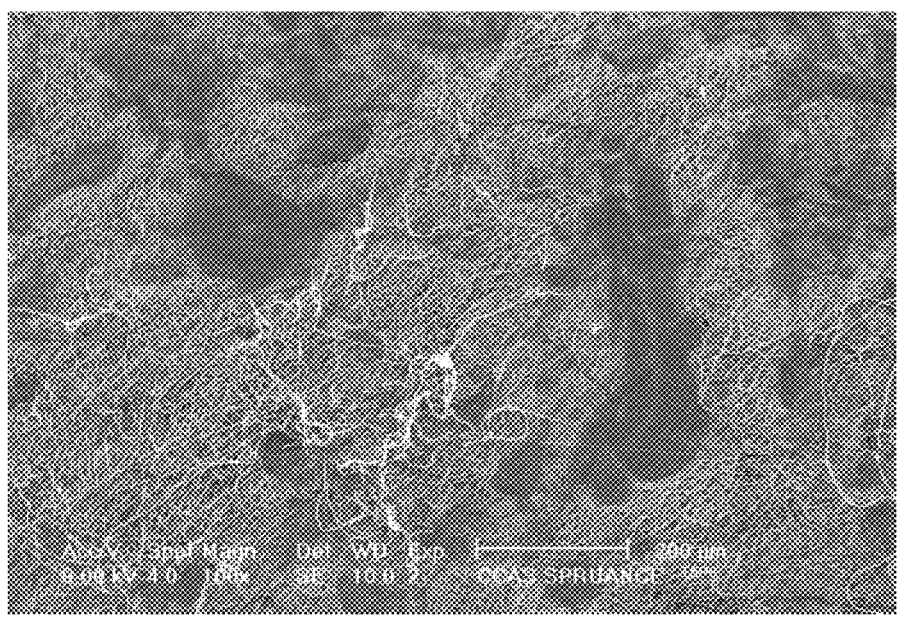
FIG. 2 is a photomicrograph of a nanoweb calendered between two hard rolls, showing melted regions in the nanoweb.

By "melted region" is meant a region of the web, whether or not traversing the entire web, which is visible to the naked eye or in a micrograph and which comprises fibers that have been fused into each other and lost their individual shape. For example photomicrographs of nanowebs calendered between two hard, stainless steel rolls show spots where fibers have been fused into each other to form a bond and the fibers have lost their fibrous character. FIG. 2 shows an example of such a photomicrograph, in which areas of melting can be seen, wherein the fibers are essentially merged into each other.

By "adhesively bonded" is meant that a material is introduced into the web that bonds fibers together in selected areas upon action of heat or removal of solvent.

By "discrete discontinuous bonded areas" is meant regions in the plane of the web in which separate fibers are bonded to each other at some point, said regions not forming one continuous region that extends from any one edge of the web to another edge.

By "discrete discontinuous unbonded areas" is meant regions in the plane of the web in which separate fibers are not bonded to each other at any point, said regions not forming one continuous region that extends from any one edge of the web to another edge.

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

In a first embodiment, the invention is a nonwoven web comprising polymeric nanofibers, said web having a Poisson's Ratio of less than about 0.8, even less than about 0.3, even less than about 0.2 and even less than about 0.1.

In another embodiment, the invention is directed to a nonwoven web optionally having discrete discontinuous either bonded or unbonded areas and having less than about 15% of the area in the plane of the web comprising melted regions and being not adhesively bonded. In further embodiments the nonwoven web comprises less than about 10%, even less than about 5% or even less than about 1% melted regions by area in the plane of the web.

The improved nanowebs of the invention resist Necking, such that when a tension of 100 g/cm is applied in the MD, the improved nanowebs demonstrate Necking of less than about 10%, or even less than about 5%, or even less than about 2%, or even less than about 1%.

The nonwoven web of the invention can have a solidity of between about 10% to about 80%, even between about 20% to about 60% and even between about 20% to about 40%, and the basis weight of the web can be at least about 1 gsm, even at least about 2 gsm, even at least about 5 gsm and even at least about 20 gsm. In still further embodiment, the nonwoven web has a basis weight of less than about 50 gsm.

The nonwoven web of the invention has a minimum thickness of about 1 micrometer, and no maximum thickness. In alternative embodiments the thickness can be a maximum of about 800 micrometers or even about 400 micrometers.

In a further embodiment of the invention the nonwoven web can be any of the above mentioned webs which has a MD tensile stress at break of at least about 600 psi (4.1 MPa), even at least about 1000 psi (6.9 MPa), and even at least about 2000 psi (13.8 MPa), or a MD tensile modulus of at least about 10,000 psi (69 MPa), even at least about 20,000 psi (138 MPa), and even at least about 40,000 psi (276 MPa), or both.

In a still further embodiment, the nonwoven web can be any of the above mentioned webs and which has a Surface Stability Index of greater than about 100 lbf/inch (17,513 N/m), or a surface coefficient of friction of less than about 0.9, or both.

The improved nanowebs of the present invention can demonstrate maximum pore sizes, measured as Bubble Point (BP), in the range of about 0.1 micrometer to about 15 micrometers, even between about 0.5 micrometer to about 2.5 micrometers, and mean flow pore sizes (MFP) in the range of between about 0.01 micrometer to about 5 micrometers, even between about 0.2 micrometer to about 3 micrometers, or even between about 0.2 micrometer and 1.5 micrometers. An indication of the pore size distributions of the improved nanowebs of the invention can be determined by the ratio of the BP/MFP, which can be in the range of about 1.1 to about 6, even from about 1.1 to about 4.

The as-spun nonwoven web comprises primarily or exclusively nanofibers that are produced by electrospinning, such as classical electrospinning or electroblowing, and in certain circumstances, by meltblowing processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A substrate or scrim can be arranged on the collector to collect and combine the nanofiber web spun on the substrate, so that the combined fiber web is used as a high-performance filter, wiper and so on. Examples of the substrate may include various nonwoven cloths, such as meltblown nonwoven cloth, needle-punched or spunlaced nonwoven cloth, woven cloth, knitted cloth, paper and the like, and can be used without limitations so long as a nanofiber layer can be added on the substrate.

The following electrobowing process conditions can be used to manufacture the web of the invention.

Voltage applied to the spinneret is preferably in the range of about 1 to 300 kV and more preferably of about 10 to 100 kV. The polymer solution can be discharged in a pressure ranging from about 0.01 to 200 kg/cm$^2$ and in preferably about 0.1 to 20 kg/cm$^2$. This allows the polymer solution to be discharged in large quantity in an adequate manner for mass production. The process of the invention can discharge the polymer solution with a discharge rate of about 0.1 to 5 cc/min-hole.

Compressed air injected via the air nozzle has a flow rate of about 10 to 10,000 m/min and preferably of about 100 to 3,000 m/min. Air temperature is preferably in the range of about 300° C. and more preferably of about 100° C. The die to collector distance (DCD), i.e. the distance between the lower end of the spinning nozzle and the suction collector, is preferably about 1 to 200 cm and more preferably 10 to 50 cm.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers and mixtures thereof. Preferred materials that fall within these generic classes include, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6,6, nylon 6,6-6,10 and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The *Handbook of Plasticizers*, edited by George Wypych, 2004 Chemtec Publishing, incorporated herein by reference, discloses other polymer/plasticizer combinations which can be used in the present invention.

The as-spun nanoweb of the present invention can be calendered in order to impart the desired improvements in physical properties. In one embodiment of the invention the as-spun nanoweb is fed into the nip between two unpatterned rolls in which one roll is an unpatterned soft roll and one roll is an unpatterned hard roll, and the temperature of the hard roll is maintained at a temperature that is between the $T_g$, herein defined as the temperature at which the polymer undergoes a transition from glassy to rubbery state, and the $T_{om}$, herein defined as the temperature of the onset of melting of the polymer, such that the nanofibers of the nanoweb are at a plasticized state when passing through the calendar nip. The composition and hardness of the rolls can be varied to yield the desire end use properties. In one embodiment of the invention, one roll is a hard metal, such as stainless steel, and the other a soft-metal or polymer-coated roll or a composite roll having a hardness less than Rockwell B 70. The residence time of the web in the nip between the two rolls is controlled by the line speed of the web, preferably between about 1 m/min and about 50 m/min, and the footprint between the two rolls is the MD distance that the web travels in contact with both rolls simultaneously. The footprint is controlled by the pressure exerted at the nip between the two rolls and is measured generally in force per linear CD dimension of roll, and is preferably between about 1 mm and about 30 mm.

Further, the nonwoven web can be stretched, optionally while being heated to a temperature that is between the $T_g$ and the lowest $T_{om}$ of the nanofiber polymer. The stretching can take place either before and/or after the web is fed to the calender rolls, and in either or both of the MD or CD.

Test Methods

Surface Stability Index (SSI) is a measure of the tendency of the fibers at the surface of the web to break free upon being pulled. Surface Stability Index of the web was measured by the following technique. A magnetic bar was placed into the lower mount point on an extensometer (MTS QUEST™ 5). A steel plate approximately 4"×6" was placed on top of the magnet. On the steel plate, a piece of 2-sided tape was firmly attached, the tape being about 2.5" wide and about 3" long. A piece of the material to be tested, at least 2"×2" was laid gently, but smoothly atop the 2-sided tape. Care was taken not to disrupt the surface of the material being tested; wrinkles and folds were avoided.

The test probe was a steel cylinder, with an end diameter of ⅝" (Area=1.23 in$^2$). The end of this probe was covered with a piece of the same 2-sided tape, and the tape was cut to fit the probe. The probe was mounted into a 50 N load cell on the extensometer crosshead. The crosshead was lowered so that the probe rest 500 µm-1000 µm above the surface of the sample. This starting point was assigned as zero extension.

The probe was allowed to travel downward (toward the sample) at a continuous rate of 0.050 in/min. The probe continued down until a normal force of 0.5 lbs was established between the sample and the probe. The probe remained in this position for 10 seconds. The probe direction was then reversed and it traveled away from the sample at a continuous rate of 0.010 in/min. This motion continued until the crosshead reached its starting point.

The slope of a Load vs. Extension graph near the Load=0 axis for the unloading portion of the test was extracted from the data. The start point for slope calculation was assigned as near to the Load=0 axis as possible, with preference given to a point with a positive load value. The end point was chosen along the linear portion of the unloading curve, at a point more than 10 µm (in extension) from the start point. The test software automatically fitted a least squares linear trendline to the data between the start point and end point and the slope of the trend line was reported in lb/in (N/m). The absolute value of the slope was reported as SSI.

The measurement was made twice on each side of a given sample, but no specimen was reused (i.e. the test was destructive). Both pieces of tape (on the sample plate and the probe) are replaced after each measurement. The four specimen values are averaged to give a single surface stability value for the sample.

Mean Flow Pore Size and Bubble Point were measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 µm to 300 µm by using automated bubble point method from ASTM Designation F 316 using a capillary flow porosimeter (model number CFP-34RTF8A-3-6-L4, Porous Materials, Inc. (PMI), Ithaca, N.Y.). Individual samples (8, 20 or 30 mm diameter) were wetted with low surface tension fluid (1,1,2,3,3,3-hexafluoropropene, or "Galwick," having a surface tension of 16 dyne/cm). Each sample was placed in a holder, and a differential pressure of air was applied and the fluid removed from the sample. The differential pressure at which wet flow is equal to one-half the dry flow (flow without wetting solvent) is used to calculate the mean flow pore size using supplied software. Bubble Point refers to the largest pore size.

Basis Weight (BW) was determined by ASTM D-3776, which is hereby incorporated by reference and reported in g/m² (gsm).

Solidity was calculated by dividing the basis weight of the sample in g/m² by the polymer density in g/cm³ and by the sample thickness in micrometers and multiplying by 100, i.e., Solidity=basis weight/(density×thickness)×100%. % Porosity=100%−% Solidity.

Fiber Diameter was determined as follows. Ten scanning electron microscope (SEM) images at 5,000× magnification were taken of each fine fiber layer sample. The diameter of eleven (11) clearly distinguishable fine fibers were measured from the photographs and recorded. Defects were not included (i.e., lumps of fine fibers, polymer drops, intersections of fine fibers). The average (mean) fiber diameter for each sample was calculated.

Thickness was determined by ASTM D-645 (or ISO 534), which is hereby incorporated by reference, under an applied load of 50 kPa and an anvil surface area of 200 mm². The thickness is reported in mils and converted to micrometers. Ionic Resistance in organic electrolyte is a measure of a separator's resistance to the flow of ions, and was determined as follows. Samples were cut into small pieces (1.5 cm diameter) and soaked in 2 M solution of LiCl in methanol electrolyte. The separator resistance was measured using Solartron 1287 Electrochemical Interface along with Solartron 1252 Frequency Response Analyzer and the Zplot software. The test cell had a 0.3165 square cm electrode area that contacts the wetted separator. Measurements were done at AC amplitude of 10 mV and the frequency range of 10 Hz to 500,000 Hz. The high frequency intercept in the Nyquist plot was the separator resistance (in ohms). The separator resistance (ohms) was multiplied with the electrode area (0.3165 square cm) to determine ionic resistance in ohms-cm².

MacMullin Number (Nm) is a dimensionless number and is a measure of the ionic resistance of the separator, and is defined as the ratio of the resistivity of a separator sample filled with electrolyte to the resistivity of an equivalent volume of the electrolyte alone. It is expressed by:

$$Nm = (R_{separator} \times A_{electrode})/(\rho_{electrolyte} \times t_{separator}),$$

wherein $R_{separator}$ is the resistance of the separator in ohms, $A_{electrode}$ is the area of electrode in cm², $\rho_{electrolyte}$ is the resistivity of electrolyte in ohms-cm, and $t_{separator}$ is the thickness of separator in cm. The resistivity of 2 M solution of LiCl in methanol electrolyte at 25° C. is 50.5 ohms-cm.

Tensile Modulus was measured on an extensometer (MTS QUEST™ 5) at a constant rate of elongation of 2 inches per minute. Samples were cut to a size of 1 inch×8 inches, being longer in the direction of loading. The gage length of samples was 6 inches and the starting width of samples was 1 inch. The Tensile Modulus (aka Modulus of Elasticity, Young's Modulus) is defined as the slope of a line tangential to the low-strain part of a graph of Stress(s) vs. Strain(e). Samples were tested in both the machine and cross directions.

Tensile Strength was measured on an extensometer (MTS QUEST™ 5) at a constant rate of elongation of 2 inches per minute. Samples were cut to a size of 1 inch×8 inches, being longer in the direction of loading. The gage length of samples was 6 inches and the starting width of samples was 1 inch. The Tensile Strength is defined as the maximum load supported by a test piece divided by its cross-sectional area (A=width× thickness). Samples were tested in both the machine and cross directions.

Necking describes how much the width of a sample decreases (in the cross direction) as a tensile load is applied in the machine direction. This is a non-standard test run on an extensometer (MTS QUEST™ 5). The sample extension was incremented in 0.5 mm intervals, with load and width data recorded at each increment. The width was always measured at the narrowest point on the test sample. The gage length of samples was 6 inches and the starting width of samples was 2 inches. Percent Width (defined as Measured Width÷Initial Width×100%) was plotted against Line Tension (defined as Load÷Initial Width). A 3rd degree polynomial with intercept=100% was fitted to this data, and the necking value was reported as the value of this polynomial at 100 g/cm. The same measurement procedure was used to determine Poisson's Ratio.

The static coefficient of friction was measured in accordance with TAPPI Method T 503, using a Testing Machines Incorporated (Amityville, N.Y.) Coefficient of Friction Tester model no. 32-25. A sample was mounted on an inclined plane, with a matching sample mounted to the bottom of a 2.5" square metal sled. The metal sled had a conductive flap attached, which mounted into a circuit at the left end of the inclined plane. At the right end of the plane, there was an electric motor which increased the angle of elevation of the plane compared to level at a rate of 1.5+/−0.5 degrees per second. When the metal sled first moved, the switch at the left end of the plane was broken, and the electric motor stopped. The angle at which the plane rested was recorded. The static coefficient of friction was the tangent of this angle.

EXAMPLES

The examples were spun from polyamide (Nylon-6,6) with a $T_{om}$ of about 215° C. In Examples 1-3, as-spun nanofiber sheets with number average fiber diameters of about 717 microns and target basis weights of about 18 gsm were calendered, by delivering a nanofiber sheet to a two roll calender nip from an unwind. A device for spreading the sheet prior to the nip was used to maintain a flat, wrinkle free sheet upon entering the nip. The hard roll was a 9.76 inch (24.79 cm) diameter steel roll, and the soft roll was a nylon-surfaced roll having a Shore D hardness of about 85, and about 10.5 inches (26.67 cm) in diameter.

Figure 3A:
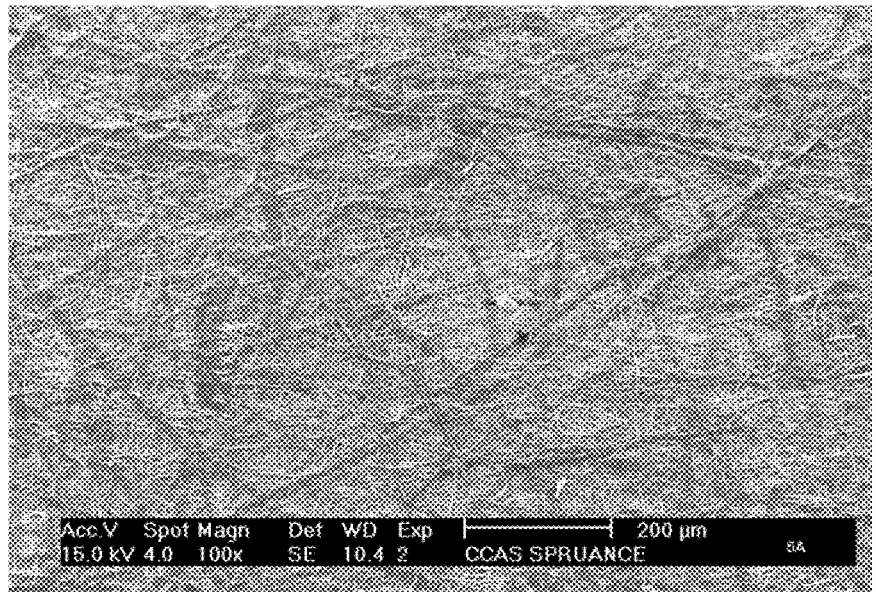
FIGS. 3a and 3b are photomicrographs of a nanoweb calendered in the manner of the present invention.
Figure 3B:
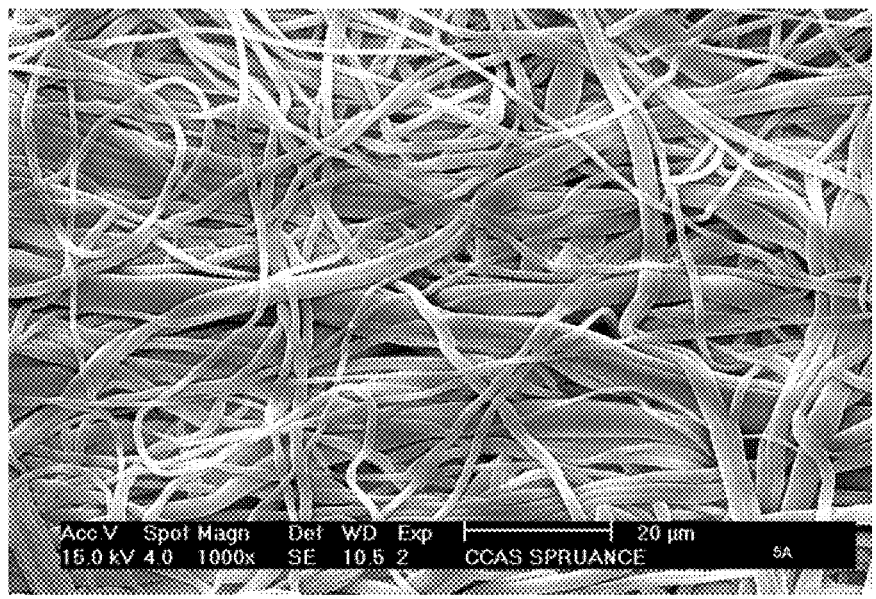

FIG. 3a shows a photomicrograph of an example of a typical web obtained by the process of the invention, in which individual fibers, while flattened (FIG. 3b), are not melted into each other into a non-fibrous mass, but retain their fibrous nature.

Comparative Example 1

Comparative example 1 was an uncalendered nanoweb (FIG. 1). It had a maximum pore size of about 7 micrometers, and a mean flow pore size of about 3 micrometers.

Example 1

The winding speed of the sheet was 10 ft/min (3.05 m/min), and the temperature of the hard roll was 80° C. Pressure in the nip was documented via the nip footprint of 12.64 mm. The sheet was stretched after calendering with a tension of 62.5 g/cm at the exit of the nip. The processed nanoweb had a maximum pore size of about 2.6 micrometers and a mean flow pore size of about 1.0 micrometer.

Example 2

The winding speed of the sheet was 10 ft/min (3.05 m/min), and the temperature of the hard roll was 50° C. Pressure in the nip was documented via the nip footprint of 12.64 mm. The sheet was stretched after calendering with a tension of 62.5 g/cm at the exit of the nip. The processed nanoweb had a maximum pore size of about 2.7 micrometers and a mean flow pore size of about 1.1 micrometer.

Example 3

A nanoweb was made and calendered in accordance with Example 2, but was stretched with a tension of 198 g/cm tension at the exit of the nip. The processed nanoweb had a maximum pore size of about 2.3 micrometers and a mean flow pore size of about 0.9 micrometer.

Comparative Example 2

A 17 gsm meltblown web with a mean fiber diameter of 0.85 μm was prepared from polypropylene (Basell, Wilmington, Del.) X11292-36-6 of 1200 g/10 minutes Melt Flow Rate (MFR).

Comparative Example 3

A 17 gsm meltblown web with a mean fiber diameter of 0.94 μm was prepared from polypropylene (Basell, Wilmington, Del.) PF017 (2000 MFR, peroxide coated).

Results

Table 1 shows results obtained from Examples 1 through 3 and Comparative Example 1. The data in Table 1 demonstrate that nanowebs subjected to the calendering process of the present invention are greatly improved in Poisson Ratio and resistance to Necking, as compared to the as-spun nanowebs of Comparative Example 1.

TABLE 1

| Sample | BW (gsm) | Tensile Strength (MPa) | Modulus (MPa) | Necking at 100 g/cm (%) | PR | Solidity (%) |
|---|---|---|---|---|---|---|
| Comp. Ex. 1 | 15.81 | 3.5 | 32.5 | 12.35 | 0.99 | 17.3 |
| Example 1 | 17.05 | 9.3 | 155.5 | 1.05 | 0.19 | 34.74 |
| Example 2 | 17.21 | 8.0 | 205.1 | 1.65 | 0.29 | 34.13 |
| Example 3 | 15.08 | 8.9 | 151.3 | 0.65 | 0.14 | 31.65 |

Surface stability was measured as described above on samples from examples 2 and 4, using Comparative Example 1 as a control. Comparative Examples 2 and 3 were also tested. Table 2 shows the improvement that is obtained in surface stability by the process of the invention.

TABLE 2

| Sample | Surface stability (N/m) |
|---|---|
| Comparative 1 | 2140 |
| Example 1 | 84629 |
| Example 3 | 82267 |
| Comparative 2 | 10021 |
| Comparative 3 | 1993 |

In Table 3 is shown the improved coefficient of friction of the product of the invention.

TABLE 3

| Sample | Coefficient of Friction |
|---|---|
| Comparative 1 | 1.042 |
| Example 1 | 0.881 |
| Example 2 | 0.580 |
| Example 3 | 0.636 |

In Table 4 is shown the ionic resistance of the product of the invention. Of significance is the fact that the resistance is not increased, or is only insignificantly increased, by the process of the invention as shown by Example 1 and 2 as compared to Comparative Example 1. Also of significance is that the ionic resistance can be significantly altered by stretching the web before or after calendaring as shown by Example 3 and Comparative Example 1. The web of this invention is stronger, has better surface stability, and still has lower ionic resistance as shown by Example 3 in comparison with CE1.

TABLE 4

| Sample | Ionic Resistance (Ohm · cm$^2$) |
|---|---|
| Comparative 1 | 0.855 |
| Example 1 | 0.857 |
| Example 2 | 1.175 |
| Example 3 | 0.774 |

We claim:
1. A nonwoven nanoweb comprising polymer nanofibers, said web having a Poisson Ratio of less than 0.8, a solidity of at least 20%, a basis weight of at least 1 gsm, a thickness of at least 1 μm, a tensile modulus in the machine direction of at least 138 MPa, and a tensile strength at break in the machine direction of at least 6.9 MPa, wherein the nanoweb is calendered by being fed into the nip between two unpatterned rolls wherein at least one of the rolls has a hardness less than Rockwell B70 and a Shore D hardness of about 85 and wherein the nanoweb has melted regions with less than 15% by area in the plane of the web comprising said melted regions.

2. The nonwoven nanoweb of claim 1 having discrete discontinuous either bonded or unbonded areas and having less than 15% by area in the plane of the web comprising melted regions and the web being not adhesively bonded.

3. The nonwoven nanoweb of claim 1 having less than 1% by area in the plane of the web comprising melted regions.

4. The nonwoven nanoweb of claim 1 having a basis weight of less than 50 gsm.

5. The nonwoven nanoweb of claim 1 in which the Poisson Ratio is measured under tensile stress applied in the machine direction of the web.

6. The nonwoven nanoweb of claim 1, having a maximum pore size of from 0.1 μm to 15 μm and a mean flow pore size of from 0.01 μm to 5 μm.

7. The nonwoven nanoweb of claim 1, having an electrical resistance of less than or equal to 2 ohms-cm$^2$ in 2 M lithium chloride in methanol electrolyte, and a MacMullin number of from 2 to 15.

8. The nonwoven nanoweb of claim 1, which has less than 20% necking in the cross direction when a tension of 100 g/cm is applied in the machine direction of the web.

9. The nonwoven nanoweb of claim 1, having a Surface Stability Index of greater than about 17,513 N/m.

10. The nonwoven nanoweb of claim 1, having a coefficient of friction of less than 0.9.

11. The nanoweb of claim 1 comprising electroblown or electrospun fibers.

12. The nanoweb of claim 1 having less than 10% by area in the plane of the web comprising melted regions.

13. The nanoweb of claim 1 made by calendering a polymeric nanoweb through a nip between a first roll and a second roll and applying a pressure to the web across the thickness of the web, wherein one of the first roll and the second roll is a hard roll, the other roll being a soft roll, and heating the web to a temperature between the $T_g$ and $T_{om}$ of the nanoweb polymer, where $T_{om}$ is defined as the temperature of the onset of melting of the polymeric nanoweb.

14. The nonwoven nanoweb of claim 1 wherein the rolls exert a pressure at the nip to provide a footprint of between about 1 mm to about 30 mm.

15. A nonwoven nanoweb comprising polymer nanofibers having a solidity of at least 20%, a basis weight of at least 1 gsm, a thickness of between 1 μm and 400 μm, a maximum pore size of 15 micrometers, and a tensile strength at break in the machine direction of at least 6.9 MPa, wherein the nanoweb has melted regions with less than 15% by area in the plane of the web comprising said melted regions and the nanoweb is calendered by being fed into the nip between two unpatterned rolls in which one roll is an unpatterned soft roll and one roll is an unpatterned hard roll, wherein the soft roll has a hardness less than Rockwell B70 and a Shore D hardness of about 85, and the temperature of the hard roll is maintained at a temperature that is between the $T_g$ and the $T_{om}$ of the polymer nanofibers.

16. The nonwoven nanoweb of claim 15, wherein said maximum pore size is between 0.1 micrometer to 15 micrometers, said web having a mean flow pore size between 0.01 micrometer to 5 micrometers.

17. The nonwoven nanoweb of claim 16, having a ratio of maximum pore size/mean flow pore size between 1.1 to 6.

18. The nonwoven nanoweb of claim 15, having a solidity between 20% and 80%.

19. The nonwoven nanoweb of claim 18, wherein the solidity is between 20% to 40%.

20. A nonwoven nanoweb comprising polymer nanofibers having a solidity of at least 20%, a basis weight of at least 1 gsm, a thickness of between 1 μm and 400 μm, a Surface Stability Index of greater than about 17,513 N/m, a tensile modulus in the machine direction of at least 138 MPa, and a tensile strength at break in the machine direction of at least 6.9 MPa, wherein the nanoweb has melted regions with less than 15% by area in the plane of the web comprising said melted regions and the nanoweb is calendered by being fed into the nip between two unpatterned rolls in which one roll is an unpatterned soft roll and one roll is an unpatterned hard roll, wherein the soft roll has a hardness less than Rockwell B70 and a Shore D hardness of about 85, and the temperature of the hard roll is maintained at a temperature that is between the $T_g$ and the $T_{om}$ of the polymer nanofibers and wherein the rolls exert a pressure at the nip to provide a footprint of between about 1 mm to about 30 mm.

21. The nonwoven nanoweb of claim 1, 15, or 20, further comprising a second web joined in a face-to-face relationship with the nonwoven web and wherein the second web is selected from the group consisting of one or more nanowebs, a scrim, and any combination of the preceding laminated together.

22. A filtration media comprising the nonwoven nanoweb of claim 1, 15, or 20.

23. A separator for an energy storage device comprising the nonwoven nanoweb of claim 1, 15, or 20.

24. The nonwoven nanoweb of claim 15 wherein the rolls exert a pressure at the nip to provide a footprint of between about 1 mm to about 30 mm.

* * * * *